United States Patent
Dauerer et al.

(10) Patent No.: US 7,302,636 B2
(45) Date of Patent: Nov. 27, 2007

(54) ENHANCED POSITION CONTROL OF WEB PAGES

(75) Inventors: Norman J Dauerer, Hopewell Junction, NY (US); Edward E Kelley, Wappingers Falls, NY (US)

(73) Assignee: International Business Machines Corporation, Armonk, NY (US)

(*) Notice: Subject to any disclaimer, the term of this patent is extended or adjusted under 35 U.S.C. 154(b) by 307 days.

(21) Appl. No.: 10/950,068

(22) Filed: Sep. 24, 2004

(65) Prior Publication Data

US 2005/0097443 A1    May 5, 2005

Related U.S. Application Data

(62) Division of application No. 09/356,971, filed on Jul. 19, 1999, now Pat. No. 6,823,490.

(51) Int. Cl.
G06F 15/16    (2006.01)
G06F 17/40    (2006.01)

(52) U.S. Cl. .................. 715/513; 715/501.1; 715/525; 709/219

(58) Field of Classification Search ................ 715/525, 715/501.1, 513; 709/219
See application file for complete search history.

(56) References Cited

U.S. PATENT DOCUMENTS

| | | | |
|---|---|---|---|
| 5,708,825 A | 1/1998 | Sotomayor | |
| 5,710,887 A | 1/1998 | Chelliah et al. | |
| 5,717,860 A | 2/1998 | Graber et al. | |
| 5,724,595 A | 3/1998 | Gentner | |
| 5,802,299 A * | 9/1998 | Logan et al. | 709/218 |
| 5,905,991 A | 5/1999 | Reynolds | |
| 5,977,972 A | 11/1999 | Bates et al. | |
| 5,983,245 A | 11/1999 | Newman et al. | |
| 6,035,330 A | 3/2000 | Astiz et al. | |
| 6,108,675 A | 8/2000 | Gregg et al. | |
| 6,192,258 B1 | 2/2001 | Kamada et al. | |
| 6,230,321 B1 | 5/2001 | Kim | |
| 6,247,029 B1 | 6/2001 | Kelley et al. | |
| 6,405,176 B1 | 6/2002 | Toohey | |
| 6,405,238 B1 * | 6/2002 | Votipka | 709/203 |
| 6,633,316 B1 | 10/2003 | Maddalozzo, Jr. et al. | |

* cited by examiner

*Primary Examiner*—Larry D. Donaghue
(74) *Attorney, Agent, or Firm*—DeLio & Peterson, LLC; Robert Curcio; Steven A. Capella

(57) ABSTRACT

A solution is presented to keep track of the URLs that have been visited within an HTML file, identify the location or exit point of the last line that was displayed on a screen in a multi-screen HTML file, and return to the exact exit point location upon reentry to the web page by computing which section of the HTML file to display on the screen, and then displaying this section. The identification of whether a web page has changed after it has been visited by a user is also presented. A cyclic redundancy check is performed, comparing the current cyclic redundancy number with the last cyclic redundancy number obtained when the screen of exited multi-screen HTML file was last visited. If the web page has changed, the user has the option of viewing the web page at the top screen or going to the screen that contains the last exit position of the HTML file that was previously viewed.

4 Claims, 3 Drawing Sheets

ENHANCED POSITION CONTROL OF WEB PAGES

This is a divisional of application(s) Ser. No. 09/356,971 filed on Jul. 19, 1999 now U.S. Pat. No. 6,823,490.

BACKGROUND OF THE INVENTION

1. Field of the Invention

The present invention relates to methods and apparatus for user access and retrieval of locations on world wide web networked computer systems, and more specifically for automatically returning to a previous screen position in the Uniform Resource Locator (URL).

2. Description of Related Art

Access and retrieval of information on the Internet is performed using Hypertext Markup Language (HTML), which is essentially a scripting language that marks up a page with formatting commands. These commands are then interpreted by a worldwide web networked computer system (web) browser and sent to a computer screen for viewing. Typically, on web pages the user can point to the words "continued on page 99" and expect page 99 to automatically appear on the viewing screen. This is possible because the page currently being viewed, and the "continued" page are linked together.

Universal resource locators are often used to direct the user through various pages at a site on the world wide web. There are two ways of linking pages: relative linking and absolute linking. Using an entire URL is absolute linking. Relative linking requires only a portion of the URL that is not already referenced by a previous URL in a URL hierarchy, to be indicated in an HTML source file. The relative link is then combined by a web browser with the previous link to build the complete URL.

Absolute linking requires the entire URL. This is an exact pointer to the location, directory, and HTML source file where the information resides that the user ultimately wants to link.

However, when a user accesses a URL then leaves the URL, there is currently no way to return to the exact position within the HTML file in the URL when the user returns to the URL at another time. When a user accesses and views a URL that presents a multi-screen web page, scrolls using a combination of the page key and slide bar, leaves the URL and later returns to the URL, the web browser does not position the viewer at the exit point in the URL. The user cannot return to the exact point on the web page that was last visited. The first issue is keeping track of the last visited position in the web page and computing the section of the web page to present on a screen, and the second issue is that the web page may have changed since last visited. It then becomes a problem to return to the last screen previously displayed when the last screen may have changed.

In U.S. Pat. No. 5,717,860, issued to Graber, et al., on 10 Feb. 1998, entitled, "METHOD AND APPARATUS FOR TRACKING THE NAVIGATION PATH OF A USER ON THE WORLD WIDE WEB," the last previous world wide web site visited by the user is determined. A database is provided for storing a plurality of user records. Each of the user records includes a user identification field for storing information uniquely associating each of the user records with a user, and a co-marketer identification field for storing identity information representing the identity of an entity that directed the user to the computer service.

Bearing in mind the problems and deficiencies of the prior art, it is therefore an object of the present invention to provide a uniform system for keeping track of the last visited position in the web page and computing the section of the web page to present on a screen.

It is another object of the present invention to provide a uniform system for returning to the last screen previously displayed when the last screen may have changed.

It is yet another object of the present invention to identify the location of the last line that was displayed on a screen in a multi-screen web page and be able to return to the exact position upon re-entry to the web page.

It is another object of the present invention to identify when a web page has been visited.

Still other advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a method of tracking uniform resource locators in a multi-screen HTML file having a top screen and at least one hyperlink line for each screen, comprising the steps of: a) traversing one or more screens in a first multi-screen HTML file; b) exiting the first multi-screen HTML file at an exit point; c) traversing other screens of at least one other multi-screen HTML file; and, d) returning to the exit point.

The exit point is at a location other than the exit point in the first multi-screen HTML file.

In a second aspect, the present invention is directed to a method for monitoring a multi-screen HTML file exit point when linking between multi-screen HTML files, comprising the steps of: a) providing a first multi-screen HTML file having a first exit point and at least one hyperlink line to a second multi-screen HTML file; b) using the hyperlink line to traverse and display a screen of the second multi-screen HTML file having a second exit point; c) identifying the first exit point location using the last of the hyperlink lines displayed on the screen of the first multi-screen HTML file; and, d) returning to the first exit point location upon re-entry from the screen of second multi-screen HTML file to the screen of the first multi-screen HTML file.

This method may further comprise identifying when the screen of the first multi-screen HTML file has been changed after the user has traversed to the screen of the second multi-screen HTML file.

Additionally, this method may further comprise the following steps: e) logging a cyclic redundancy number of the screen of the first multi-screen HTML file; f) comparing a current cyclic redundancy number of the first multi-screen HTML file with the logged cyclic redundancy number; and, g) returning to the screen of the first multi-screen HTML file that contains the last of the hyperlink lines previously viewed.

Alternatively, this method may further comprise the steps: e) logging a first cyclic redundancy number of the first multi-screen HTML file; f) comparing the first logged cyclic redundancy number of the first multi-screen HTML file with a current cyclic redundancy number; g) returning to the exit point of the first multi-screen HTML file if the current cyclic redundancy number is the same as the first logged cyclic redundancy number; and, h) returning to the top screen of the first multi-screen HTML file if the current cyclic redundancy number is different from the first logged cyclic redundancy number.

In a third aspect, the present invention is directed to a method of tracking a uniform resource locator in a first multi-screen HTML file having a top screen, and exit point, and at least one hyperlink line for each screen, comprising the steps of: a) accessing the uniform resource locator from the first multi-screen HTML file; b) comparing the uniform resource locator accessed to uniform resource locators stored in a uniform resource locator table; c) displaying the accessed uniform resource locator if the uniform resource locator is not in the table; d) performing a cyclic redundancy check by comparing a current cyclic redundancy number to a logged cyclic redundancy number; e) if the current cyclic redundancy number is equal to the logged cyclic redundancy number:

1) identifying the exit point of the last of the hyperlink lines displayed from the uniform resource locator;
 2) identifying the number of lines of the HTML file that can be displayed on the screen;
 3) computing a first section of the HTML file using the line number of the last of the hyperlink lines; and,
 4) displaying the first section of the HTML file on a web browser; and, f) if the current cyclic redundancy number is not equal to the logged cyclic redundancy number, displaying the accessed uniform resource locator at the beginning of the HTML file on a web browser.

This method may further comprise the steps of: g) scrolling forwards and backwards on the HTML file using a slide bar and page keys; h) identifying a new uniform resource locator number of the last line of the hyperlink lines displayed on the screen; i) comparing the new uniform resource locator number to the uniform resource locator table values; j) if the new uniform resource locator number is not in the uniform resource locator table, adding the new uniform resource locator and corresponding cyclic redundancy number to the table; k) adding the last line of the hyperlink lines to the uniform resource locator table; l) computing a second section of the HTML file using the line number of the last of the hyperlink lines; and, m) displaying the second section of the HTML file on a web browser.

The present invention is directed to, in a fourth aspect, a method of tracking uniform resource locators in a multi-screen HTML file having a top screen and at least one hyperlink line for each screen, comprising the steps of: a) traversing one or more screens in a first set of multi-screen HTML files; b) exiting the first set of multi-screen HTML files at a plurality of exit points; c) traversing other screens of at least one other set of multi-screen HTML files; and, d) returning to the exit points from the at least one other set of multi-screen HTML files.

In a fifth aspect, the present invention is directed to a program storage device readable by machine, tangibly embodying a program of instructions executable by the machine to perform the method steps for tracking uniform resource locators in a multi-screen HTML file having a top screen and at least one hyperlink line for each screen, where a user traverses one or more screens in a first multi-screen HTML file, exits the first multi-screen HTML file, and returns to the first file, the method steps comprising: a) adapting the program to exit the first multi-screen HTML file at an exit point; b) retaining the exit point location and allowing the user to traverse other screens of at least one other multi-screen HTML file; and, c) returning to the exit point.

In a sixth aspect, the present invention is directed to a program storage device readable by machine, tangibly embodying a program of instructions executable by the machine to perform the method steps for monitoring a web page screen location when linking between multi-screen web pages, the method steps comprising: a) providing a first multi-screen HTML file having a first exit point and at least one hyperlink line to a second multi-screen HTML file, b) using the hyperlink line to traverse and display a screen of the second multi-screen HTML file having a second exit point; c) identifying the first exit point location using the last of the hyperlink lines displayed on the screen of the first multi-screen HTML file; d) returning to the first exit point location upon re-entry from the screen of second multi-screen HTML file to the screen of the first multi-screen HTML file; and, e) identifying when the screen of the first multi-screen HTML file has been changed after the user has traversed to the screen of the second multi-screen HTML file.

The present invention is directed to, in a seventh aspect, a program storage device readable by machine, tangibly embodying a program of instructions executable by the machine to perform the method steps for tracking a uniform resource locator in a first multi-screen HTML file having a top screen and at least one hyperlink line for each screen, the method steps comprising: a) accessing the uniform resource locator from the first multi-screen HTML file; b) comparing the uniform resource locator accessed to uniform resource locators stored in a uniform resource locator table; c) displaying the accessed uniform resource locator if the uniform resource locator is not in the table; d) performing a cyclic redundancy check by comparing a current cyclic redundancy number to a logged cyclic redundancy number; e) if the current cyclic redundancy number is equal to the logged cyclic redundancy number:

1) identifying the exit point of the last of the hyperlink lines displayed from the uniform resource locator;
 2) identifying the number of lines of the HTML file that can be displayed on the screen;
 3) computing a first section of the HTML file using the line number of the last of the hyperlink lines; and,
 4) displaying the first section of the HTML file on a web browser; and, f) if the current cyclic redundancy number is not equal to the logged cyclic redundancy number, displaying the accessed uniform resource locator at the beginning of the HTML file on a web browser.

This program storage device may further comprise the method steps of: g) scrolling forwards and backwards on the HTML file using a slide bar and page keys; h) identifying a new uniform resource locator number of the last line of the hyperlink lines displayed on the screen; i) comparing the new uniform resource locator number to the uniform resource locator table values; j) if the new uniform resource locator number is not in the uniform resource locator table, adding the new uniform resource locator and corresponding cyclic redundancy number to the table; k) adding the last line of the hyperlink lines to the uniform resource locator table; l) computing a second section of the HTML file using the line number of the last of the hyperlink lines; and, m) displaying the second section of the HTML file on a web browser.

Lastly, in an eighth aspect, the present invention is directed to a program storage device readable by machine, tangibly embodying a program of instructions executable by the machine to perform the method steps for tracking uniform resource locator exit points in a first set of multi-screen HTML files having a top screen and at least one hyperlink line for each screen, where a user traverses one or more screens in said first set of multi-screen HTML files, exits said first set of multi-screen HTML files at a plurality of exit points, and returns to any of said exit points, said method steps comprising: a) adapting said program to exit said first set of multi-screen HTML files at said plurality of exit points; b) retaining said plurality of exit point locations and allowing said user to traverse other screens of at least one other set of multi-screen HTML files; and, c) returning to said exit points from said at least one other set of multi-screen HTML files.

The first set of multi-screen HTML files may comprise more than one HTML file, and the at least one other set of multi-screen HTML files may comprise more than one HTML file.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
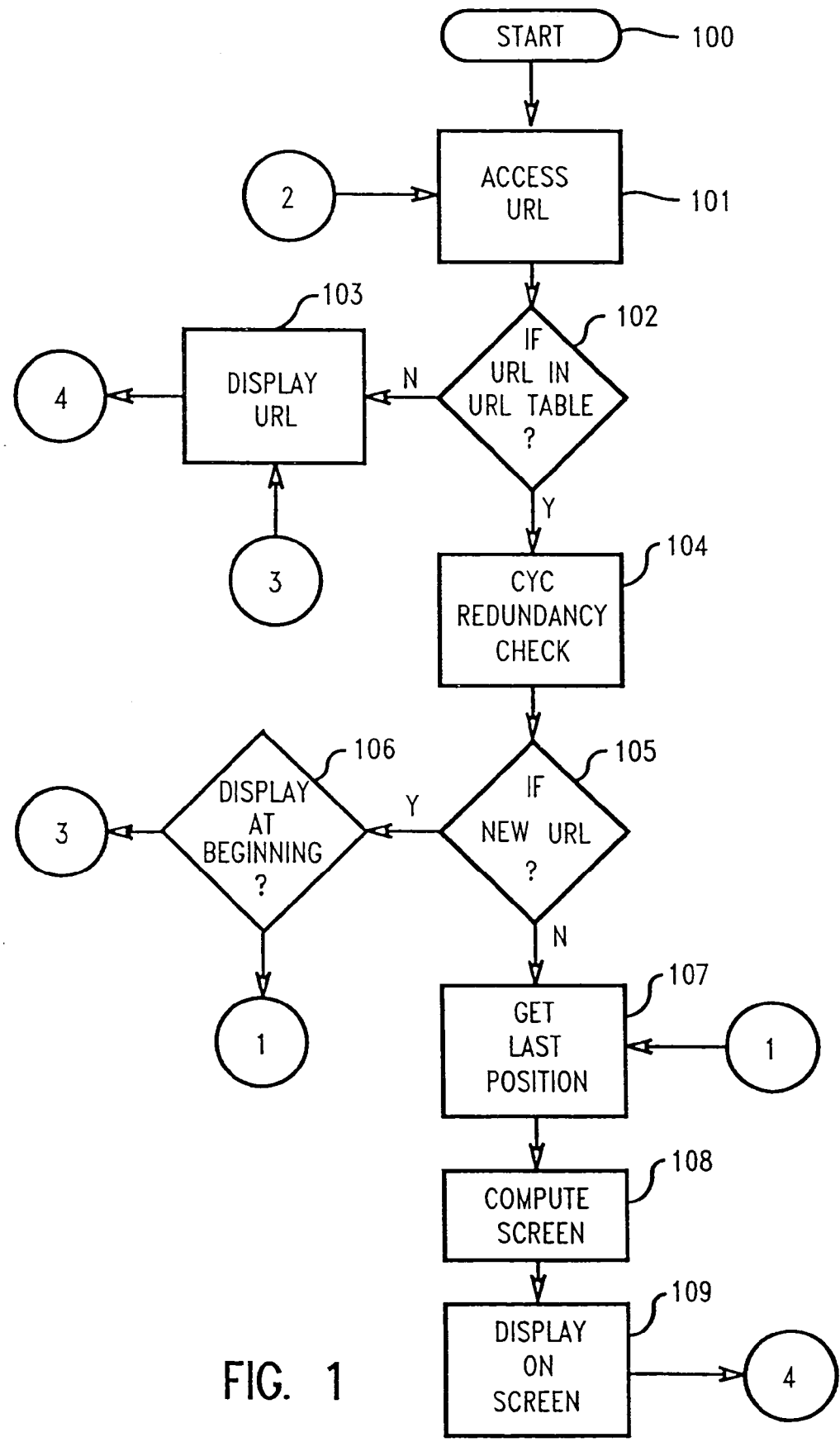
FIG. 1 is a flow chart of the method of the present invention indicating decision options for comparing URLs to those in a table, incrementing a cyclic redundancy check number, and obtaining the last URL position.

In describing the preferred embodiment of the present invention, reference will be made herein to FIGS. 1-3 of the drawings in which like numerals refer to like features of the invention. Features of the invention are not necessarily shown to scale in the drawings.

The following terms in the art are defined herein as they pertain to the enhanced position control of web pages:

URL Table—This is a table that contains a URL, the CRC number and the line number of the last line of the HTML file that was displayed at the bottom of the screen.

CRC—Cyclic Redundancy Check.

Cyclic Redundancy Number or CRC Number—This is a number produced by a cyclic redundancy check.

HTML—This stands for the Hypertext Markup Language.

HTML Source File—File with the HTML markup tags to be converted by a web browser to be displayed on a monitor. This file may also have code such as java and or java script. This is executed by the browser to display on a monitor.

HTML File—This is an HTML source file that has been formatted by the web browser and/or had code such as java script or java executed, and the output of the formatting and/or code execution is displayed on a monitor.

SCREEN—This is a portion of the HTML file that the viewer sees when a web browser displays the HTML file on a monitor.

URL (Uniform Resource Locator) This is a text string that indicates the server protocol to use in accessing the resource, the Internet domain name of the server, and the name and location of the resource on the particular server.

WEB PAGE—This is an HTML file.

The present invention keeps track of the URLs that were visited, identifies the location of the exit point (last line that was displayed on a screen in a multi-screen HTML file) and is able to return to the exact position of the exit point upon re-entry to the HTML file by computing which section of the HTML file to display on the screen and displaying this section. Since the HTML file may have changed since the last time the URL was visited, it is also desirable to identify when an HTML file is visited, keeping and comparing the current cyclic redundancy number with the previous cyclic redundancy number to see if the HTML file has changed. If the HTML file has changed, the viewer has the option of viewing the HTML file at the top screen, or going to the screen that contains the last line position of the HTML file that was previously viewed.

Figure 2:
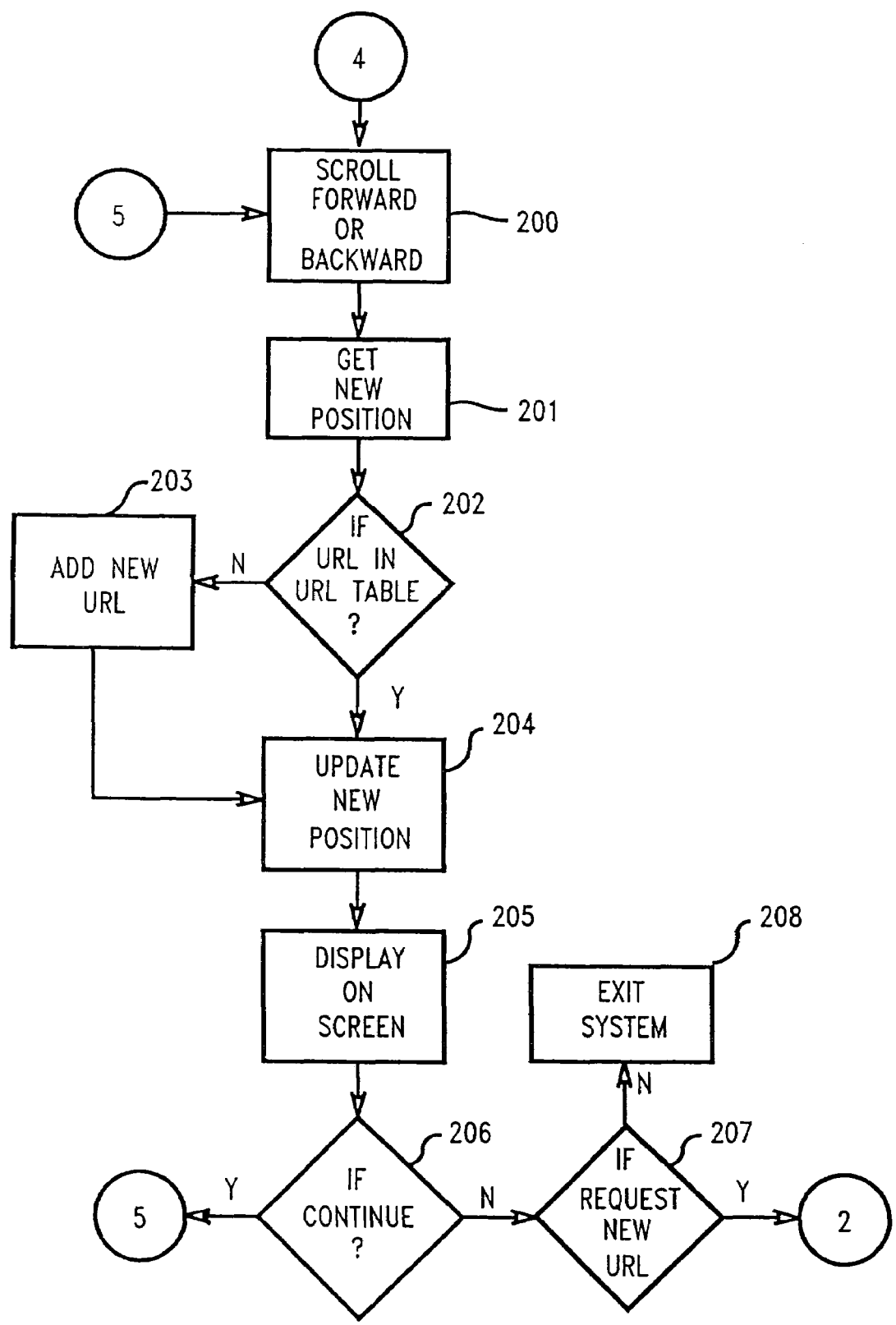
FIG. 2 is continuation of the flow chart of FIG. 1 indicating decision options for obtaining a new URL, updating the new URL position, and displaying this new position on the screen.

FIGS. 1 and 2 delineate the program flow for identifying the last position of the exit point in the URL when a user returns to the URL at another time.

As indicated in the FIG. 1 flowchart, the user starts the process at 100. Next, the system accesses the URL from a web browser 101. A check 102 is then made to assess whether the URL identifier is in a URL table. If the URL is not in the URL table, the URL is displayed 103, else, a cyclic redundancy check (CRC) 104 is performed on the URL. If the URL is displayed 103, then a new position is obtained 200, as depicted in FIG. 2.

Next, the URL is checked to see if it has changed since the last time it was accessed 105 by comparing the CRC number of the cyclic redundancy that was just done with the stored CRC number from the URL table. If the URL is new 106, it is possible to display this new URL at the beginning of the HTML file. The user is queried for this option. Otherwise, if the URL is not changed, the last position is acquired 107. The line number of the last line of the HTML file that was displayed at the bottom of the screen from the URL table is obtained. The screen is then computed 108 by identifying the number of lines of an HTML file that can be displayed on the screen, using the line number of the last line of the HTML file that was displayed from the URL table, and computing the section of the HTML file to display on the web browser. The portion of the HTML file that was just computed is then displayed 109 on the screen.

If the URL is displayed as indicated in 103, the system then uses the web browser to scroll 200 forward or backward on the HTML file. The line number in the HTML file of the last line that was displayed at the bottom of the screen is then retrieved 201. Again, a check is performed 202 to inquire if the URL is in the URL table. If not, the URL is added to the URL table, and the CRC is also added to the URL table 203. If, however, the URL checked in 202 above was in the URL table, a new position is updated 204. This is accomplished by adding the last line of the HTML file that was displayed on the bottom of the screen to the URL table. The portion of the HTML file that was just computed is then displayed 205 on the screen.

At this point the user is queried as to whether a new display on the screen is desired 206, and if so, whether one should continue. If the user elects to continue, the system again uses the web browser to scroll 200 forward or backward on the HTML file. Else, a new URL may be requested 207, and then accessed from the web browser 101. Otherwise, the user may opt to exit the system 208. Scrolling is achieved by using the page keys and slide bar.

Additionally, the present invention is capable of logging and returning to a plurality of exit points in a set of multi-screen HTML files after the user has traversed through a second set of multi-screen HTML files.

Figure 3:
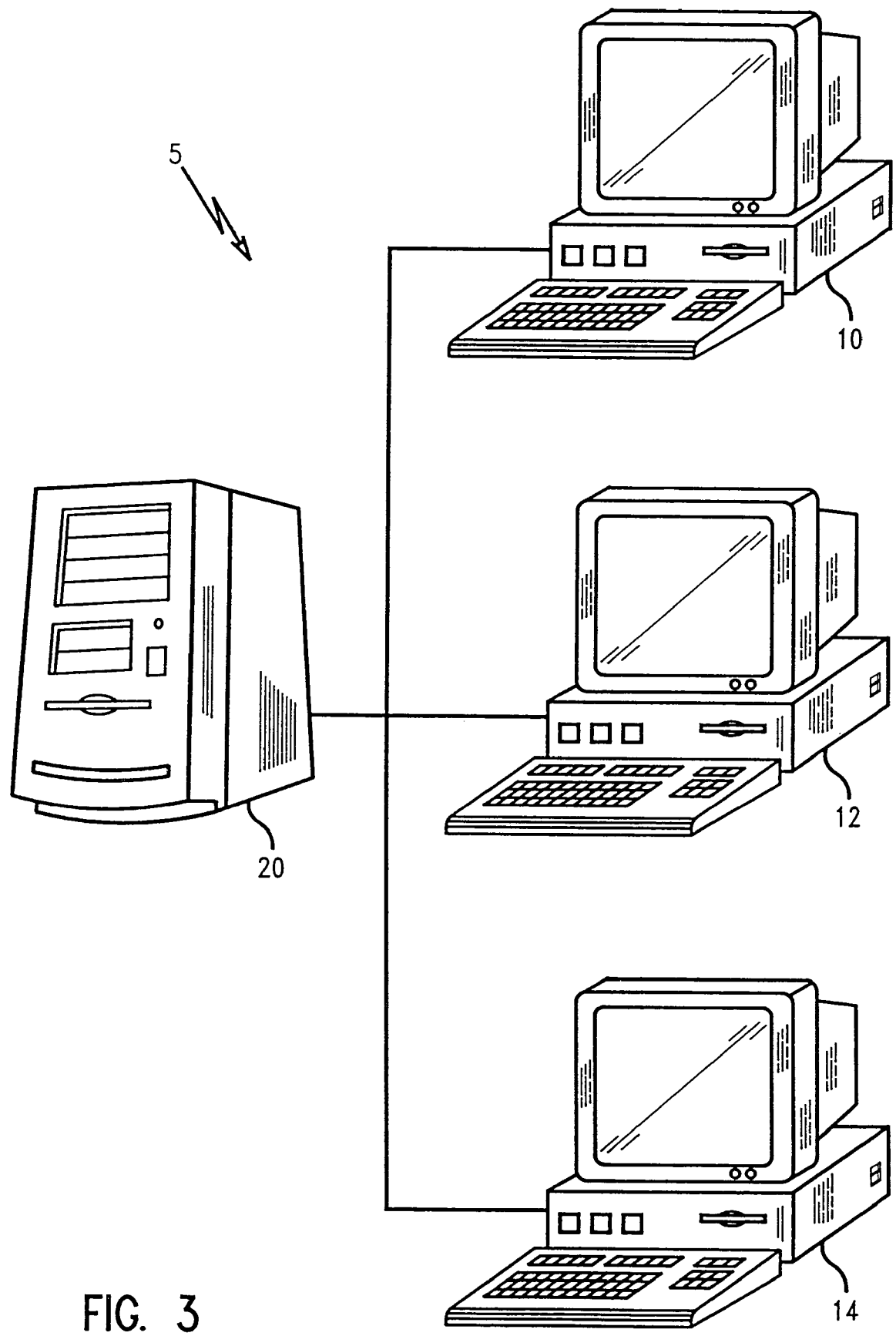
FIG. 3 represents a computer system for performing the method of enhanced position control of web pages.

FIG. 3 represents a computer system for performing the method of enhanced position control of web pages. A program storage device 20 readable by machine 10, 12, 14, tangibly embodies a program of instructions executable by the machine 20 to perform the above-identified method steps depicted in FIGS. 1 and 2 for tracking a uniform resource locator in a first multi-screen HTML file having a top screen and a hyperlink line for each screen.

The present invention provides a uniform system for returning to the last screen previously displayed by keeping track of the last visited position in a web page or HTML file and computing the section of the web page to present to the user on a screen. It also keeps track of when the last HTML file has been visited so that updates to the HTML file may be recognized before the user re-enters the file.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

The invention claimed is:

1. A method of tracking a uniform resource locator in a first multi-screen HTML file having a top screen, and exit point, and at least one hyperlink line for each screen, comprising the steps of:
   a) accessing said uniform resource locator from said first multi-screen HTML file;
   b) comparing said uniform resource locator accessed to uniform resource locators stored in a uniform resource locator table;
   c) displaying said accessed uniform resource locator if said uniform resource locator is not in said table;
   d) performing a cyclic redundancy check by comparing a current cyclic redundancy number to a logged cyclic redundancy number;
   e) if said current cyclic redundancy number is equal to said logged cyclic redundancy number:
      1) identifying the exit point of the last of said hyperlink lines displayed from said uniform resource locator;
      2) identifying the number of lines of said HTML file that can be displayed on the screen;
      3) computing a first section of said HTML file using the line number of said last of said hyperlink lines; and,
      4) displaying said first section of said HTML file on a web browser; and,
   f) if said current cyclic redundancy number is not equal to said logged cyclic redundancy number, displaying said accessed uniform resource locator at the beginning of said HTML file on a web browser.

2. The method of claim 1 further comprising:
   g) scrolling forwards and backwards on said HTML file using a slide bar and page keys;
   h) identifying a new uniform resource locator number of said last line of said hyperlink lines displayed on said screen;
   i) comparing said new uniform resource locator number to said uniform resource locator table values;
   j) if said new uniform resource locator number is not in said uniform resource locator table, adding said new uniform resource locator and corresponding cyclic redundancy number to said table;
   k) adding said last line of said hyperlink lines to said uniform resource locator table;
   l) computing a second section of said HTML file using the line number of said last of said hyperlink lines; and,
   m) displaying said second section of said HTML file on a web browser.

3. A program storage device readable by machine, tangibly embodying a program of instructions executable by the machine to perform the method steps for monitoring a web page screen location when linking between multi-screen web pages, said method steps comprising:
   a) providing a first multi-screen HTML file having a first exit point and at least one hyperlink line to a second multi-screen HTML file,
   b) using said hyperlink line to traverse and display a screen of said second multi-screen HTML file having a second exit point;
   c) identifying said first exit point location using the last of said hyperlink lines displayed on said screen of said first multi-screen HTML file;
   d) returning to said first exit point location upon re-entry from said screen of second multi-screen HTML file to said screen of said first multi-screen HTML file; and,
   e) identifying when said screen of said first multi-screen HTML file has been changed after the user has traversed to said screen of said second multi-screen HTML file.

4. A program storage device readable by machine, tangibly embodying a program of instructions executable by the machine to perform the method steps for tracking a uniform resource locator in a first multi-screen HTML file having a top screen and at least one hyperlink line for each screen, said method steps comprising:
   a) accessing said uniform resource locator from said first multi-screen HTML file;
   b) comparing said uniform resource locator accessed to uniform resource locators stored in a uniform resource locator table;
   c) displaying said accessed uniform resource locator if said uniform resource locator is not in said table;
   d) performing a cyclic redundancy check by comparing a current cyclic redundancy number to a logged cyclic redundancy number;
   e) if said current cyclic redundancy number is equal to said logged cyclic redundancy number:
      1) identifying the exit point of the last of said hyperlink lines displayed from said uniform resource locator;
      2) identifying the number of lines of said HTML file that can be displayed on the screen;
      3) computing a first section of said HTML file using the line number of said last of said hyperlink lines; and,
      4) displaying said first section of said HTIML file on a web browser; and,
   f) if said current cyclic redundancy number is not equal to said logged cyclic redundancy number, displaying said accessed uniform resource locator at the beginning of said HTML file on a web browser.

* * * * *